United States Patent [19]

Danzl et al.

[11] Patent Number: 5,769,483
[45] Date of Patent: Jun. 23, 1998

[54] CONVERTIBLE MOTOR VEHICLE ROOF

[75] Inventors: Martin Danzl, München; Arpad Fürst, Germering; Johann Mayer, Petershausen; Stefan Miklosi, München; Peter Reihl, Starnberg, all of Germany

[73] Assignee: Webasto Karosseriesysteme GmbH, Stockdorf, Germany

[21] Appl. No.: 537,447

[22] Filed: Oct. 2, 1995

[30] Foreign Application Priority Data

Sep. 30, 1994 [DE] Germany .......................... 44 35 222.0

[51] Int. Cl.⁶ ....................................................... B60J 7/08
[52] U.S. Cl. ..................... 296/107; 296/108; 296/116; 296/216; 296/221
[58] Field of Search .................................... 296/107, 108, 296/116, 117, 146.14, 146.16, 216, 221

[56] References Cited

U.S. PATENT DOCUMENTS

| | | |
|---|---|---|
| 2,704,225 | 3/1955 | Anschuetz . |
| 3,271,067 | 9/1966 | Rollman ................................. 296/116 |
| 3,536,354 | 10/1970 | Ingram ............................... 296/107 X |
| 4,838,604 | 6/1989 | Kochi ................................. 296/107 X |
| 5,542,735 | 8/1996 | Furst et al. ........................ 296/116 X |
| 5,558,388 | 9/1996 | Fürst et al. . |

FOREIGN PATENT DOCUMENTS

| | | |
|---|---|---|
| 0 482 681 | 4/1992 | European Pat. Off. . |
| 1049026 | 12/1953 | France . |

Primary Examiner—Joseph D. Pape
Attorney, Agent, or Firm—Sixbey, Friedman, Leedom & Ferguson; David S. Safran

[57] ABSTRACT

A convertible vehicle roof with a rigid rear roof part (7) and with a rigid rear part (8) which adjoins rear roof part (7), can be moved together with other roof parts (side roof parts 5, cover 6) into a stowage space (19) located in the rear of a vehicle. Compared to known hardtop vehicle roofs, the structure, mounting, sealing and insensitivity to tolerances are improved by the fact that the rear part (8) can be swung forwardly over the rear roof part (7) before they are moved together into the stowage space.

20 Claims, 14 Drawing Sheets

CONVERTIBLE MOTOR VEHICLE ROOF

BACKGROUND OF THE INVENTION

1. Field of the Invention

The invention relates to a convertible motor vehicle roof with a rear roof part and with a rear part which adjoins it, in which the rear roof part and rear part, and optionally other roof parts can be moved into a stowage space located in the rear of the vehicle.

2. Description of Related Art

In a motor vehicle roof of this type according to A1 42 03 229, and corresponding U.S. Pat. No. 5,558,388 a rear part which frames the rear window is integral with a rear roof part, the rear window having to be lowered beforehand into a stowage space before separately swinging the rear roof part. However, this separately movable rear window poses sealing problems with respect to the motor vehicle chassis.

SUMMARY OF THE INVENTION

The object of the invention is to simplify the structure of a hard-top convertible vehicle roof.

This object is achieved according to this invention by the rear part first being swung over the rear roof part and then moved into the stowage space together with the rear roof part for completely lowering the roof. Because the rear part enclosing the rear window, before completely lowering the roof, is first swung over the rear roof part and then moved with the rear roof part, and optionally other roof parts, into the stowage space, a simple, low-tolerance sealing of the rear window from above on a cover flap is possible. By separating the rear roof part from the rear part and moving them on top of one another before moving into the stowage space, moreover, the roof package can be made extremely compact before it is moved.

One embodiment which is especially simple with respect to the number of required drives arises from the fact that the rear part can be interlocked with the rear roof part before moving into the stowage space. In this way, the rear roof part does not need its own active drive, but simply a bearing which allows it to pivot relative to the vehicle chassis. The rear roof part is entrained by the drives of the rear part when it is moved.

Advantageously, the vehicle roof, as known per se from the DE A1 42 03 229 and corresponding U.S. Pat. No. 5,558,388 mentioned initially, comprises at least one roof part (cover) which can opened while driving and which can be moved into open positions on guides located in roof parts which lie laterally therefrom in the longitudinal direction of the vehicle. The side roof parts are preferably supported on the rear roof part, under or over which the openable roof part (cover) can be moved in the opened position. In addition to the greater diversity of open positions during driving, such a vehicle roof which is subdivided into additional roof parts also can be stowed especially compactly.

An especially stiff, accident-proof embodiment of a vehicle roof arises by the fact that the side roof parts can be interlocked with the stationary front roof part.

For compact joining of the roof parts before moving into the stowage space, it is advantageous if the side roof parts can be swung inward to the rear roof part, as is known in principle from DE A1 42 03 229 and corresponding U.S. Pat. No. 5,558,388.

According to one advantageous embodiment, the rear part surrounds a rear window.

Advantageously, the stowage space can be closed by means of a cover flap, against which the rear part lies tightly from above in its base position.

One especially smooth version of the closed vehicle roof arises from the fact that, before it is moved, the rear part can be raised over the rear roof part.

The rear part is moved, according to one advantageous embodiment, by means of two telescoping hydraulic cylinders which are supported on a lever which is pivotally mounted on the vehicle chassis. This lever is made, preferably, as a triangular lever with two arms which converge on the pivot on the chassis, on the outer end of each arms, a respective one of the telescoping hydraulic cylinders is connected at its lower end. Furthermore, a pivoting cylinder which is supported at one end on the chassis is connected at its other end to the lower of the two arms of the triangular lever. The rear roof part is connected via a swinging lever to the vehicle chassis. This swinging lever cannot be actively driven according to one advantageous version, but is used with the vehicle roof closed to support the rear roof part in conjunction with the interlocking of the side roof parts attached to it on the front roof part. When the rear roof part is moved into the stowage space, this lever is actuated by a swinging cylinder after interlocking the rear part with it.

To facilitate complete preliminary testing of a roof module at a vehicle supplier and installation at the vehicle manufacturer, it is provided that the pivot of the triangular lever and the lower connecting points of the swinging cylinder and the swinging lever are located on a cassette which, itself, is adjustably attached to the chassis of the vehicle. Thus, the complete roof module consisting of the movable roof parts can be completely mounted and pretested at the vehicle supplier in a device corresponding to the shell. Mounting at the vehicle manufacturer is greatly facilitated by combining all actuating elements on one cassette.

According to one advantageous alternative embodiment, the rear part is guided in its swinging movements by means of two levers which are pivotally mounted on the chassis. Preferably, one of these levers is coupled to a hydraulic cylinder. Advantageously, the two levers form a four-bar mechanism in which the rear part forms a connecting rod and in which the chassis or a part permanently connected to it forms the frame. In this embodiment, the rear part is swung by means of a four-bar mechanism formed by two levers, and needs only a single hydraulic cylinder to be driven.

According to one advantageous development of the alternative embodiment, it is provided that one lever is connected via an additional driving element to the vehicle chassis, relative to which it can be interlocked by means of a lock which can be released in the last phase of movement into the stowage space. Providing an additional driving element and a lock enables further lowering into the stowage space without the need for additional stowage space for the swinging lever.

Advantageously, to interlock the rear part with the rear roof part, there is a retaining bracket with which one end is pivotally mounted on the rear part, and during movement of the rear part above the rear roof part, engages a connecting member which inserts a locking part of the retaining bracket into a receiver on the rear roof part with a slide pin. By means of this connecting member, the retaining bracket which connects the rear part to the rear roof part can be engaged during pivoting motion of the rear roof part without an additional drive.

For locking of the latch part provided on the retaining bracket with the receiver on the rear roof part, it is advantageous if a locking element is actuated by a delivery cable of a drive which actuates the openable roof part.

A vehicle especially suited to be equipped with the vehicle roof according to the invention has a stowage space located behind the front seats which preferably has a rear seat which includes a seating surface and a backrest and which can be used in the installed state of the vehicle roof as an emergency seat, the backrest being moved to behind the back of the front seats for enlarging the stowage space before roof conversion. Preferably, a telescoping wind deflector is integrated in the seat back of the emergency seat.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 12 is a schematic perspective view of the vehicle with the roof package being swung to the rear and with side roof parts being swung in;

DETAILED DESCRIPTION OF THE PREFERRED EMBODIMENT

Vehicle 1 has chassis 2 with a vehicle roof designated 3 as a whole. Vehicle roof 3 is a so-called hard-top convertible vehicle roof which is formed form a plurality parts and can be inserted into the vehicle chassis 2 as a roof module. Roof 3 adjoins the rear of a transverse windshield support 4 which acts as the front roof part of the roof and which runs above the front windshield of the vehicle 1. Modular convertible vehicle roof 3 comprises side roof parts 5 which are detachably interlocked with the apron 4 at their front end. At their rear end, the roof parts 5 are pivotally connected to a rear roof part 7. Each side roof part 5 has a guide rail 5A (FIGS. 10 & 11) which guides the mechanics of the openable roof part (cover) 6 in a manner generally known for sliding and lifting roofs. Cover 6 can be raised above the fixed vehicle roof or can be moved to the rear into an open position in which it is inserted into the rear roof part 7.

Also, cover 6 can, alternatively, be movable in the manner of a spoiler roof into an open position where it overlies the rear roof part 7. Likewise, instead of a single cover 6, several covers or plates can be provided which in the open position are located above or below rear roof part 7. In one especially simple version which is not shown, the vehicle roof does not include a roof part which can be opened while driving or side roof parts; instead, the rear roof part extends fully forward so that its front edge directly adjoins apron 4.

A rear part 8 into which rear window 9 is insertable rearwardly adjoins the rear roof part 7. Rear part 8 sits tightly on top of a cover flap 20 which forms a transition from the roof to a trunk hood (not shown) behind it.

Figure 3:
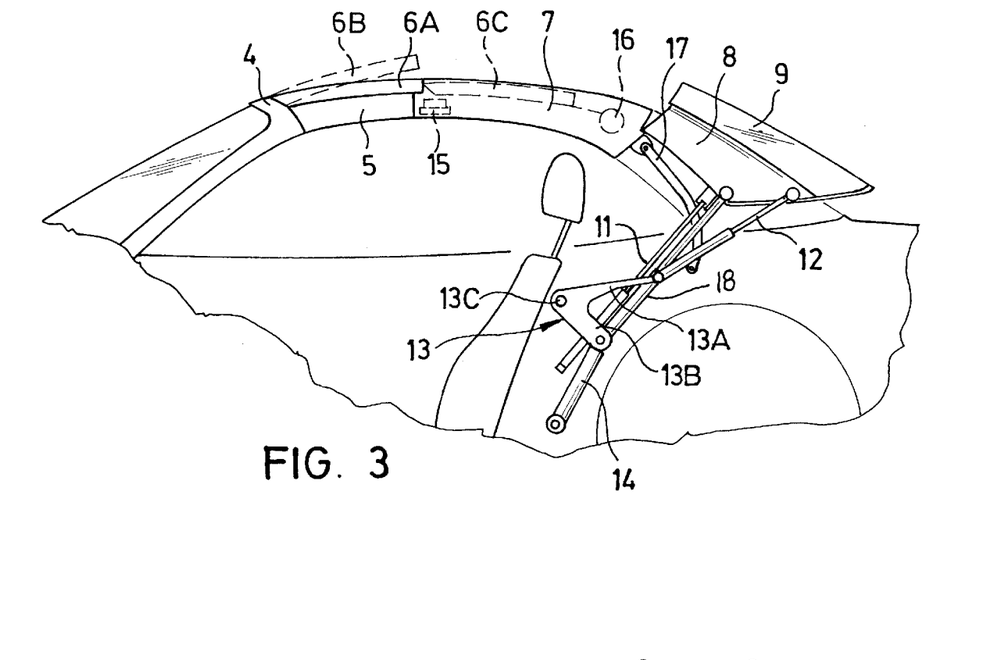
FIG. 3 shows a schematic side view of a portion of the vehicle with the rear part raised and with different cover positions.

FIG. 3 shows different open positions of cover 6. The closed position of cover 6 is labelled 6A and is in solid lines, a raised position of cover 6 is identified with broken lines as 6B, and a completely retracted, fully open position of cover 6, in which it is held by rear roof part 7, is shown in phantom outline as 6C. The cover is driven in the known manner of conventional sliding and lifting roofs, via compressively rigid cables (not shown), by means of an electric drive 16 which is located in rear roof part 7.

Side roof parts 5, which are pivotally connected to rear roof part 7, can be swung inwardly against the rear roof part 7 by means of a drive 15 after they have been disengaged from apron 4 and the roof package has been slightly tilted back.

On chassis 2, in an area between the back of the front seat 28 (FIG. 1) and the rear seat backrest 29 (FIG. 1), in the area of the side wall, a triangular lever 13 (FIG. 3) is pivotally mounted at pivot 13C. Triangular lever 13 has an upper arm 13A and a lower arm 13B which meet roughly in the area of pivot 13C. The free end of lower arm 13B of triangular lever 13 is connected to a swinging cylinder 14 in the form of a hydraulic piston-cylinder unit. The other end of swinging cylinder 14 is pivotally joined to chassis 2. By telescoping swinging cylinder 14 in and out, the triangular lever 13 can be pivoted in a defined angular range around pivot 13C. The lower end of a hydraulic cylinder 11 and of a telescoping guide 18 which is parallel to the cylinder 11 are permanently connected to triangular lever 13, and both are coupled at their upper end to a front lower corner of rear part 8. On an outer end of arm 13A (relative to pivot 13C), furthermore, a lower end of another hydraulic cylinder 12 is attached, the upper end of cylinder 12 being coupled at a distance behind the coupling point of hydraulic cylinder 11 to rear part 8. Rear roof part 7 is pivotally coupled to chassis 2 by means of swing arm lever 17. With the interlock between side roof parts 5 and apron 4 engaged, the apron 4, side roof parts 5 and rear roof part 7 form a rigid roll cage in conjunction with the swing arm lever 17.

FIG. 3 shows a first opening phase of the vehicle roof 3. In this case, rear roof part 8 has been raised up from its position shown in FIGS. 1 and 2, and relative to the rear roof part 7 and the cover flap 20, by extending hydraulic cylinders 11 and 12.

Figure 4:
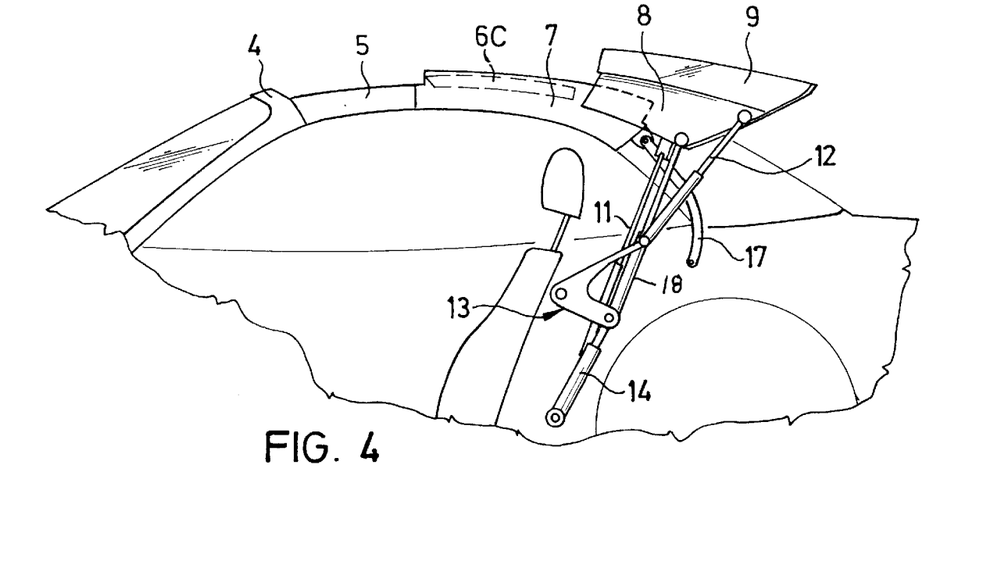
FIG. 4 shows a schematic side view of a portion of the vehicle with the rear part swung up and the cover completely opened.

In FIG. 4, the rear part 8 is being swung over rear roof part 7 by partially extending swinging cylinder 14 so as to rotate the triangular lever 13 in a forward (counterclockwise) direction. The rigid roll cage formed of the swing arm lever 17, rear roof part 7, side roof parts 5 and apron 4 remains unchanged in doing so.

Figure 5:
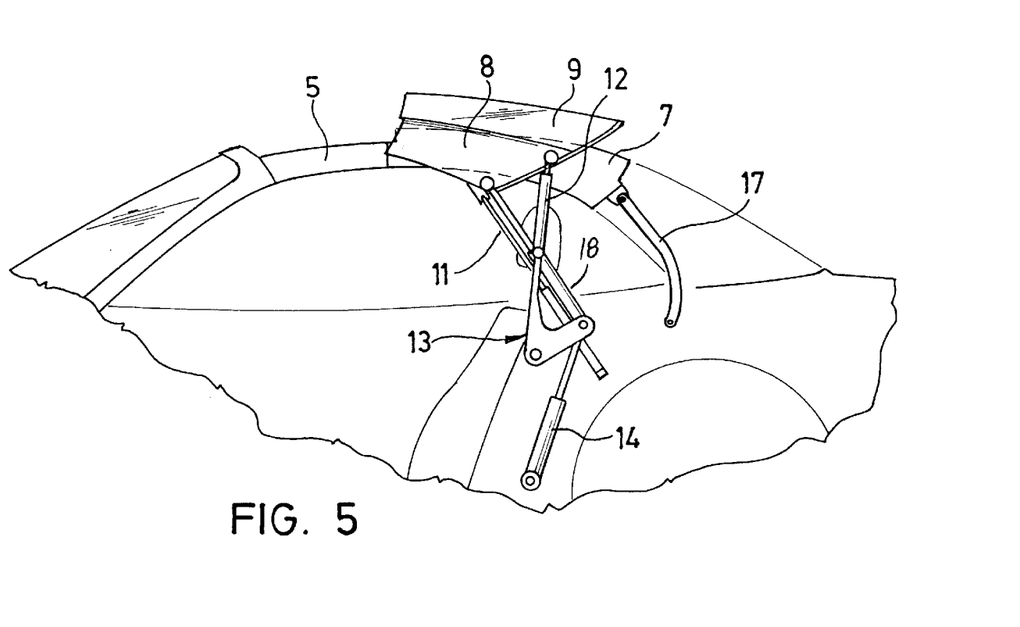
FIG. 5 shows a schematic side view of a portion of the vehicle with the rear part swung over the rear roof part.

In FIG. 5 swinging cylinder 14 is fully extended. Triangular lever 13, thus, has been swung upward in a counterclockwise direction into its end position. Rear part 8 has come to rest completely over the rear roof part 7. In this position, the rear part 8 and the rear roof part 7 are interlocked with one another. For this, there are hook-shaped elements on the inside of rear part 8 into which locking elements which can be extended from rear roof part 7 fit. These locking elements, preferably, are actuated by means of the drive 16 for cover 6 or by means of the drive 15 for swinging of the side roof parts (FIG. 3).

Figure 6:
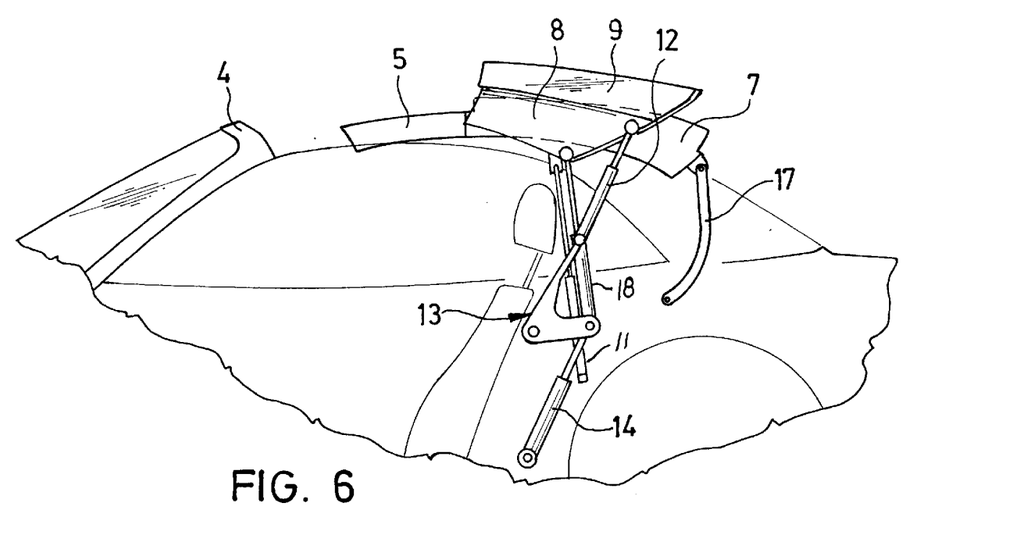
FIG. 6 shows a schematic side view of a portion of the vehicle with the roof package partially swung to the rear.

Between FIG. 5 position and the position which is shown in FIG. 6, the interlock between the side roof parts 5 and apron 4 is released. This interlock, as known of normal convertible roofs, can be actuated by means of a drive located in apron 4. After releasing the interlock between the side roof parts 5 and the apron 4, swinging cylinder 14 was partially retracted, by which the roof package of rear part 8 and rear roof part 7 has moved backward by an amount with simultaneous guidance by triangular lever 13 and swing arm lever 17. In this phase, drives 15 are activated, by which side roof parts 5 are swung inward to rear roof part 7.

Figure 7:
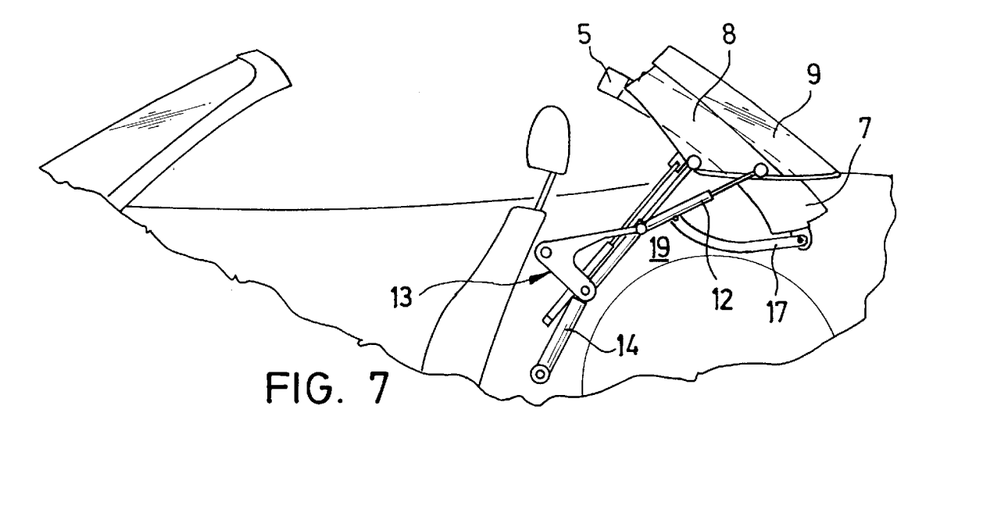
FIG. 7 shows a schematic side view of a portion of the vehicle with the roof package completely swung to the rear and side roof parts lifted.
Figure 8:
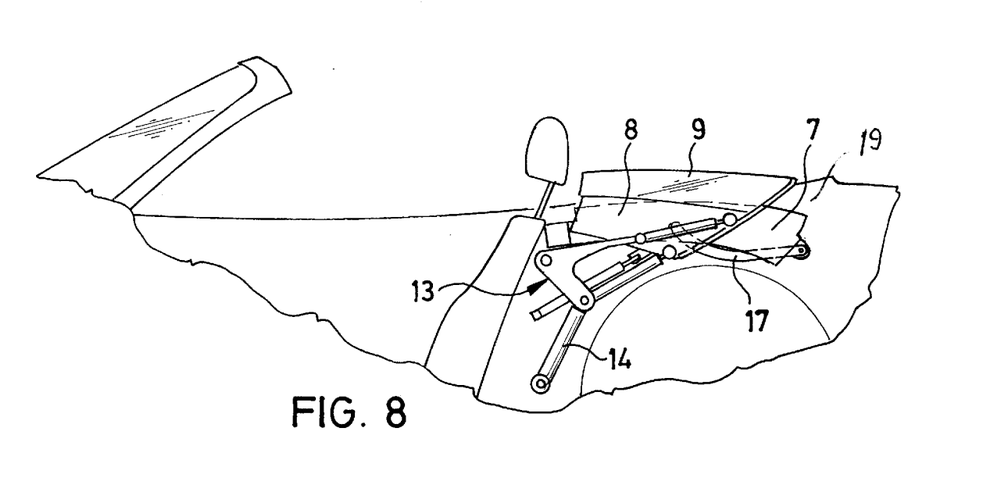
FIG. 8 shows a schematic side view of a portion of the vehicle with the roof package completely retracted into the stowage space.

In FIG. 7, swinging cylinder 14 is completely retracted, by which triangular lever 13 is pivoted into its position turned farthest downward. The roof package of rear roof part 7, rear part 8 and folded side roof parts 5 is thus swung into its rearmost position. By subsequently retracting hydraulic cylinder 11 and 12, as shown in FIG. 8, the roof package is lowered and completely retracted into stowage space 19. The roof package at this point is now completely lowered relative to the equator of vehicle 1 and is equivalent to a conventional "soft-top", fabric-roof, convertible and the cover flap 20 then covers stowage space 19 from above.

Figure 9:
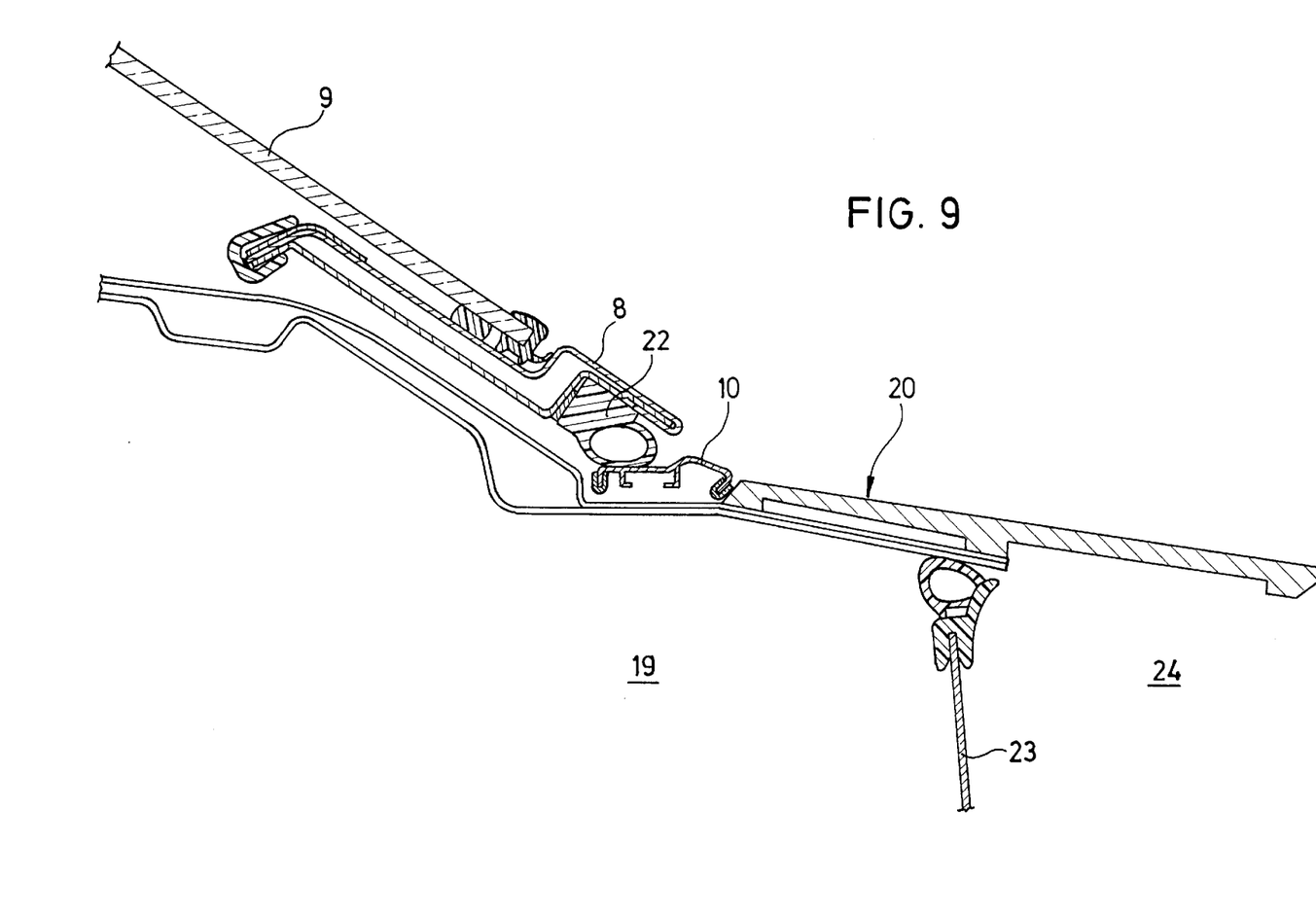
FIG. 9 is a partial longitudinal sectional view through a connecting point between the rear part and the cover flap.

FIG. 9 shows the connecting point between the raised rear part 8 and cover flap 20 in detail. As is apparent there, rear part 8 carries a seal 22 which engages on a sheet metal part 10 which is joined to cover flap 20. In this way, on the one hand, a good seal is achieved, and on the other, this connecting point is insensitive to tolerances, e.g., in the longitudinal direction of vehicle 1, and it can balance tolerances which arise in the production of chassis 2 and vehicle roof 3 in a range of several millimeters. FIG. 9, furthermore, shows a bulkhead 23 which separates the stowage space 19 from the trunk space 24, which is located behind it. Bulkhead 23 can be designed to be lowerable so that, with vehicle roof 3 raised, the trunk space 24 can be enlarged to include stowage space 19. Before lowering vehicle roof 3, bulkhead 23 is closed, and in this way, trunk space 24 again closed off from the stowage space 19.

Figure 1:
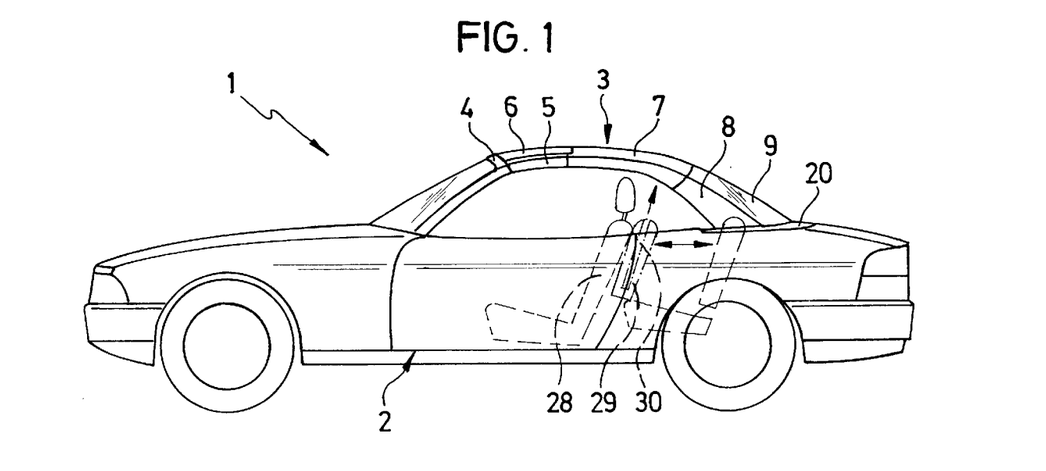
FIG. 1 shows a schematic side view of a vehicle with a hard-top convertible vehicle roof in the closed position of the roof.
Figure 2:
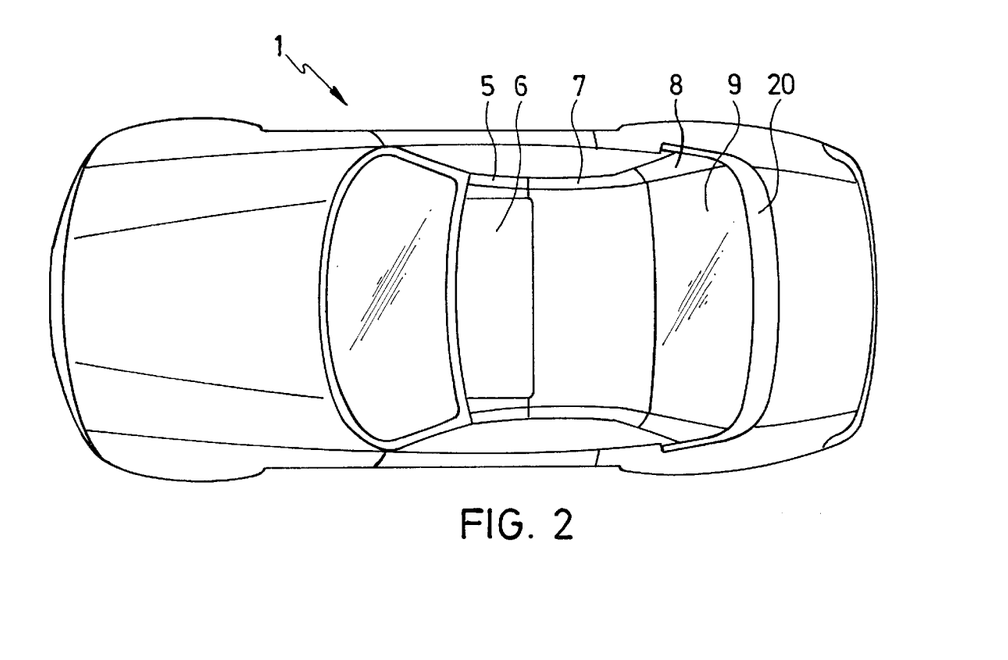
FIG. 2 shows an overhead view of the vehicle according to FIG. 1.
Figure 10:
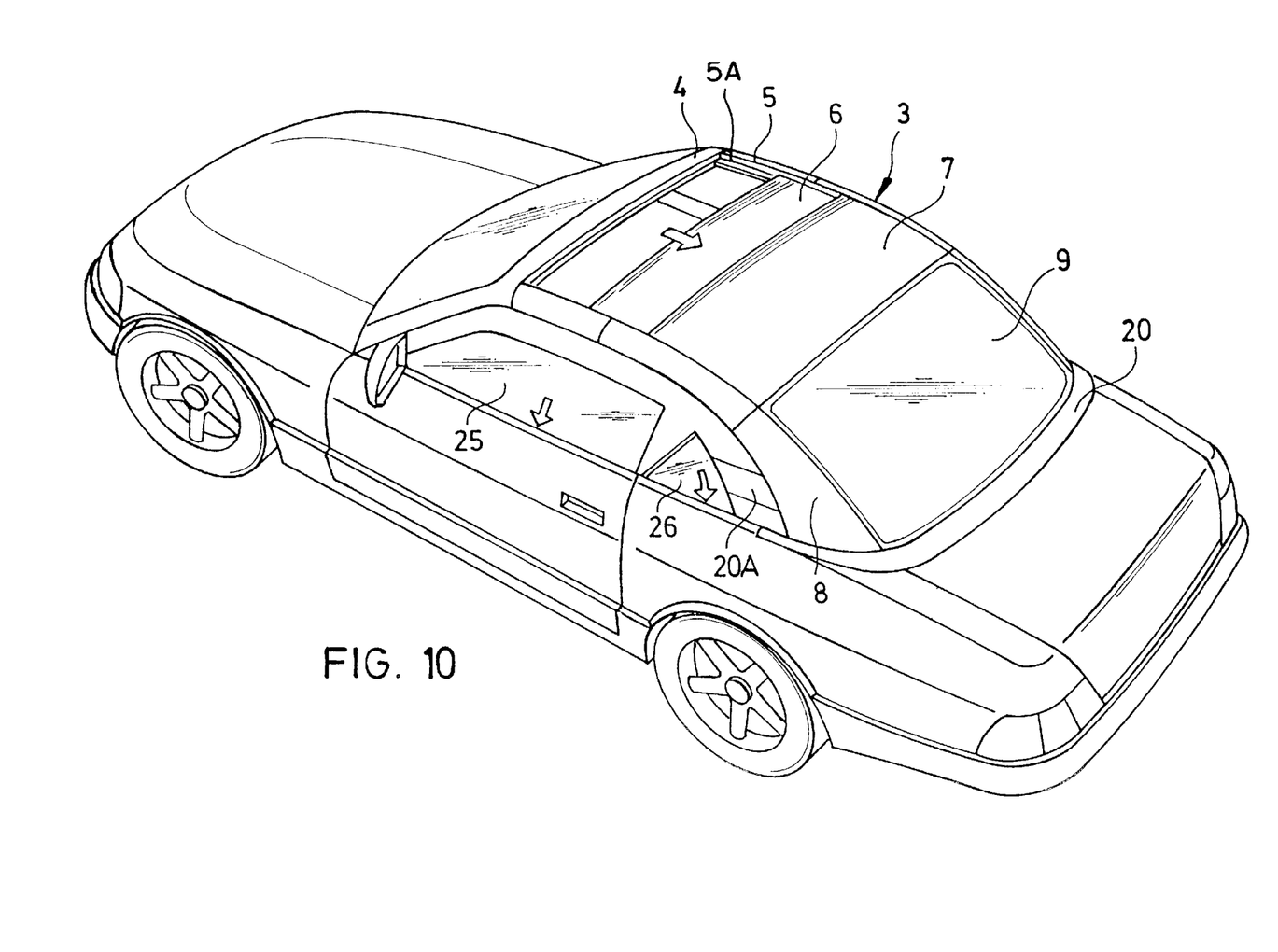
FIG. 10 is a schematic perspective view of the a vehicle with a movable cover of the vehicle roof partially opened.

FIG. 10 shows that vehicle 1 gives the impression of a closed coupe with vehicle roof 3 raised. In this position, the cover 6 can be moved into any of a number of open positions to increase ventilation beyond that obtainable by conventionally lowering side window 25 or rear side window 26. In the area of the rear side window 26, inside therefrom, side cover flaps 20A are shown which yield a closed U-shaped cover part in conjunction with cover flap 20 when viewed from above. In this state, with rear seat backrest 29 shifted rearwardly as illustrated in FIG. 1, the rear seat can be used as an emergency seat. Before moving vehicle roof 3 into stowage space 19, the rear seat back 29 is moved forward lengthwise on guide rails attached to the side walls of chassis 2, so that it rests on the rear of the front seat back 28. Preferably, an extendable wind bulkhead 30, which can be activated after completely lowering vehicle roof 3, is integrated into the rear seat back 29.

Figure 11:
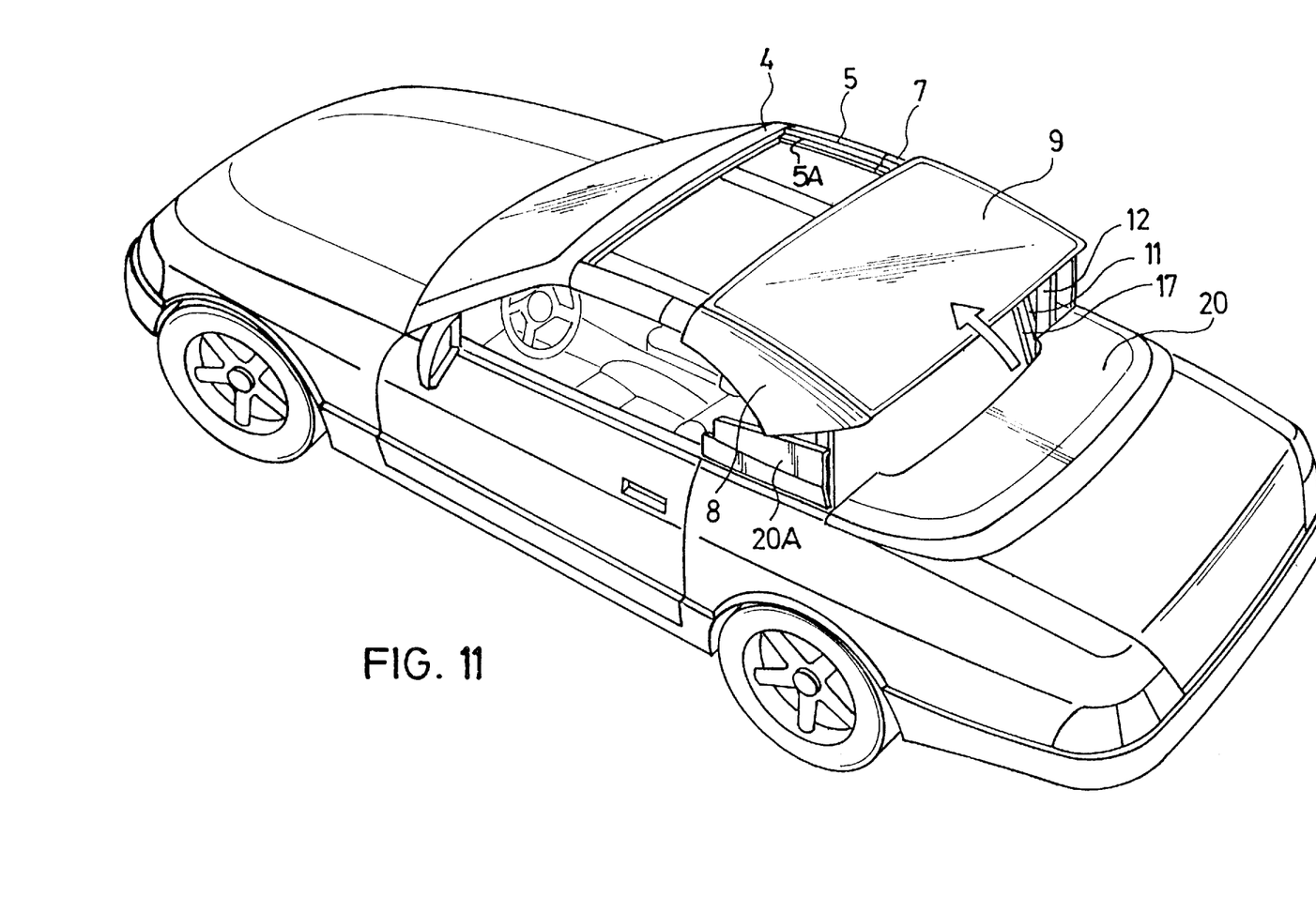
FIG. 11 shows a schematic perspective view of the vehicle with the rear part of the roof pivoted up.
Figure 12:
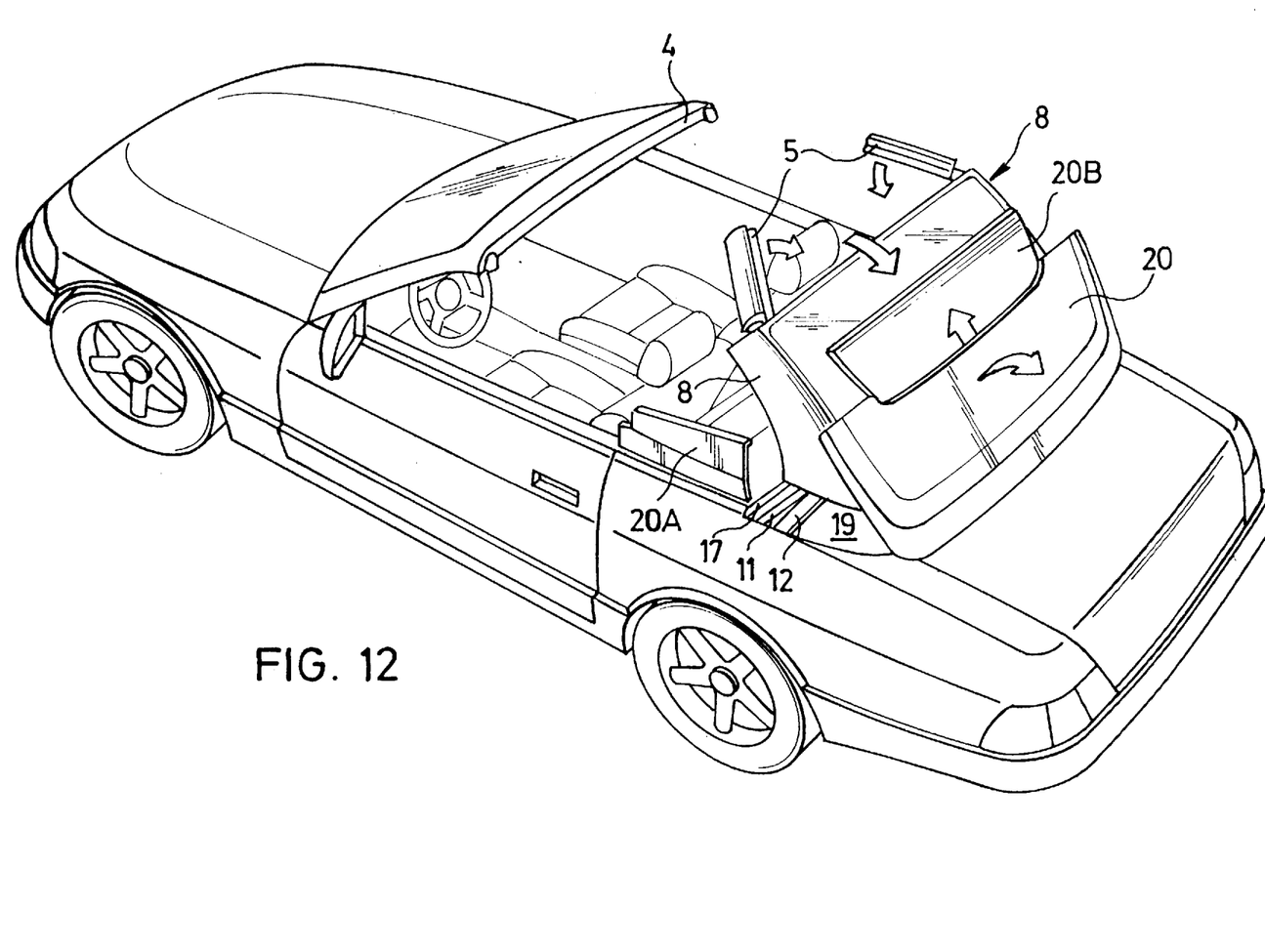

In FIG. 11, rear part 8 with completely opened cover 6 is shown being swung over the rear roof part 7 and interlocked with it. Side windows 25 and rear side windows 26 are completely lowered. Side cover flaps 20A are raised and the cover flap 20 swung upward, in order to render the stowage space 19 completely accessible from above for subsequent movement of the roof package therein. As can be seen from FIG. 12, another cover part 20B extends forward from cover flap 20. This cover part 20B acts in conjunction with side cover flaps 20A when the roof is in its closed position. In FIG. 12, the roof package has been partially swung to the rear and side roof parts 5 are shown being pivoted toward the rear roof part 7.

Figure 13:
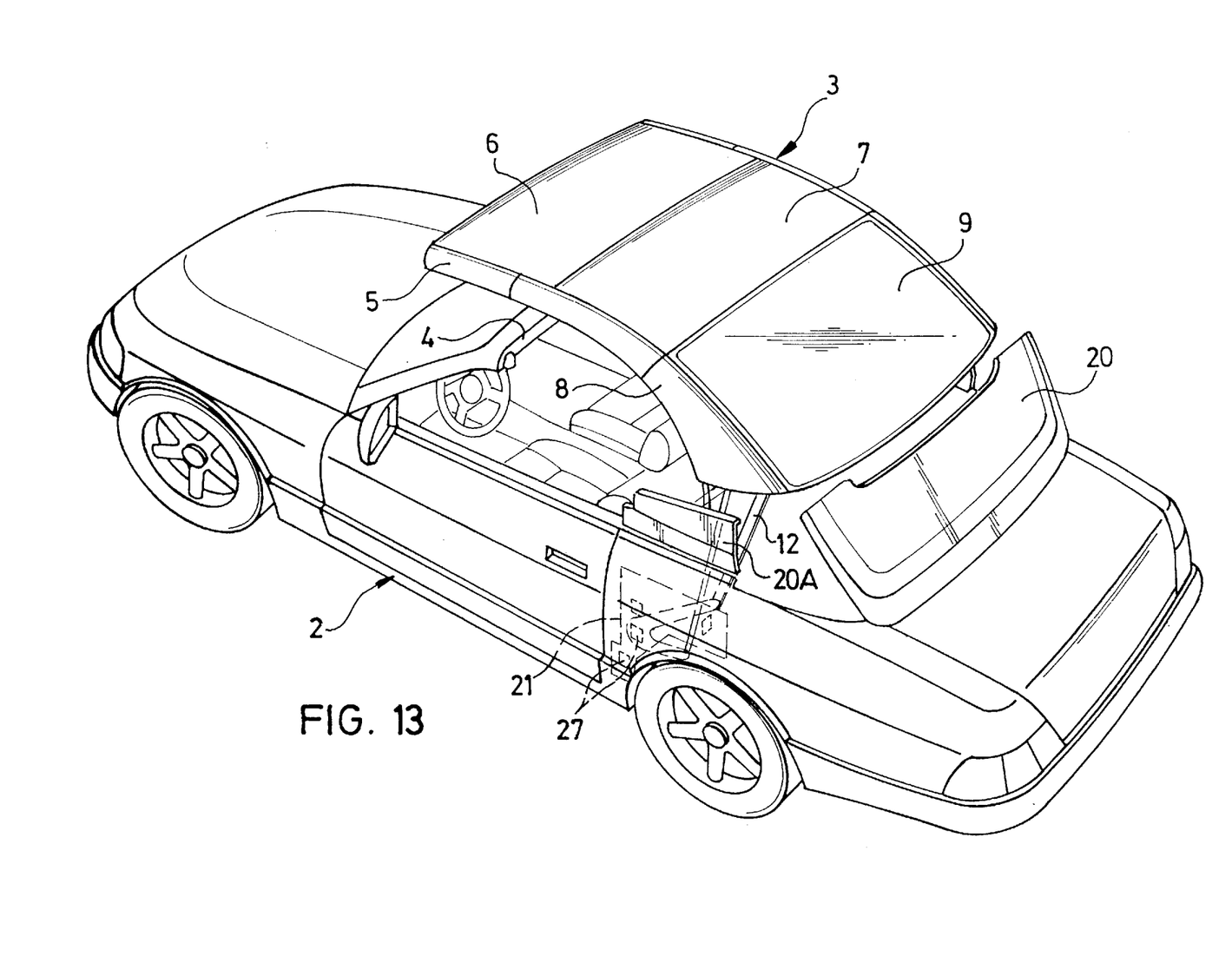
FIG. 13 shows a schematic perspective view of the entire vehicle roof module when being installed in the vehicle.

FIG. 13 shows an entire modular vehicle roof 3 supplied as a part which is fitted into chassis 2. Vehicle roof 3 comprises side roof parts 5, rear roof part 7, rear part 8 and cover 6 and is delivered completely premounted and pretested. On the chassis 2, the cover flap 20 and side cover flaps 20A are mounted and opened. On chassis 2, swinging cylinder 14 is premounted, and furthermore, attachment points 27 are provided to which cassette 21 can be attached in a manner that is height adjustable and also adjustable in the longitudinal direction of the vehicle. Cassette 21 is delivered with the vehicle roof 3, and the swing arm lever 17, triangular lever 13 and hydraulic cylinders 11 and 12 are premounted on the cassette 21 along with the telescoping guide 18. By complete pretesting and premounting of the modular vehicle roof 3, the mounting cost for the vehicle manufacturer is reduced to a minimum, and the vehicle roof 3 can be mounted with only a simple adjustment of cassette 21 relative to attachment points 27 being required on the assembly line.

In FIGS. 14–20, an alternative embodiment is shown. Here, vehicle 31 has a chassis 32 with a vehicle roof which is designated 33 as a whole, and which comprises several openable parts. As in the first embodiment, a roof part (cover 36) which can be opened in the manner of a conventional sliding sunroof or sliding-lifting sunroof is movably supported on side roof parts 35. Side roof parts 35, analogously to the first embodiment, with the vehicle roof closed, interlock with a transverse cross-piece running across the top of the windshield. The openable roof part 36, in the fully opened position (phantom line position in FIG. 14), is retracted into the rear roof part 37 behind it. Rear part 38 encloses rear window 39 adjoins the rear roof part 37.

Rear part 38 is pivotably connected by means of carrier rod 41 at upper pivot 41A. Carrier rod 41 is connected at its lower end 41B to carrier bracket 42 which is pivotably attached at pivot 42A on chassis bracket 43, which is fixed to the chassis. Carrier bracket 42 is joined to bracket 43 such that a given swinging capacity of the two elements relative to one another can be suppressed during certain phases of motion by means of a lock 44. Locking is explained specifically in conjunction with FIG. 19. It is active in the positions of FIGS. 14–16 and is released with complete lowering between the position shown in FIG. 16 and the position shown in FIG. 17, so that in doing so relative motion between carrier rod 41 and carrier 42 can take place.

Figure 18:
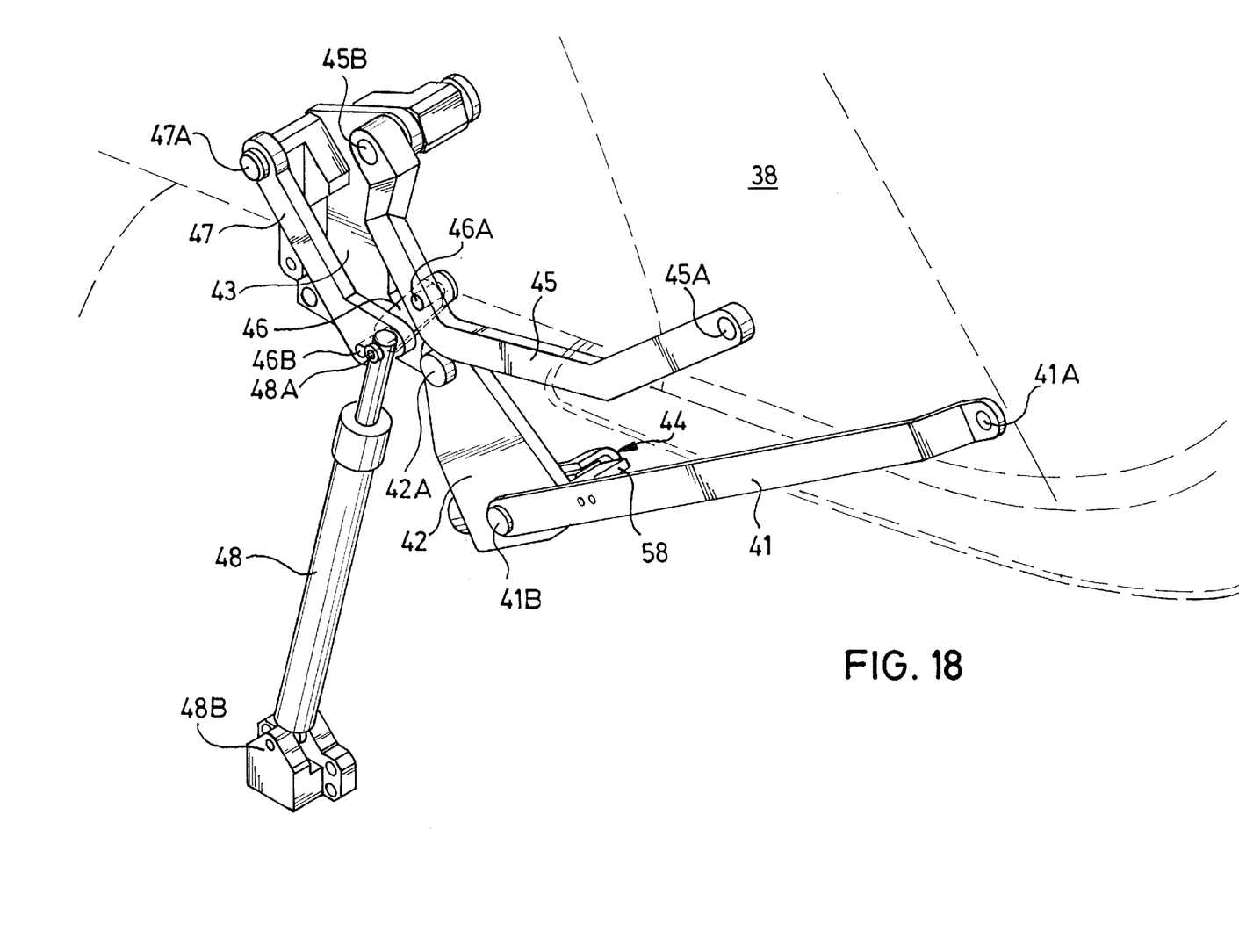
FIG. 18 is an enlarged representation of the swing mechanism for the rear part.

Rear part 38, furthermore, is pivotably connected at pivot joint 45A to one end of the cover lever 45 and the other end of cover lever 45 is pivotably attached to chassis bracket 43 at pivot joint 45B. Between pivot joints 45A and 45B, drive carrier 46 pivotably connected to cover lever 45 at pivot joint 46A; its other end 46B is pivotably connected to drive lever 47. One end 47A of drive lever 47 is hinged on bracket 43; its other end is pivoted to a hydraulic cylinder 48 at 48A, for enabling the cylinder 48 swing the rear part 38. The lower end of main cylinder 48 is hinged at a bearing 48B that is located permanently on the chassis.

Drive lever 47 and cover lever 45 form a four bar mechanism with drive carrier 46 as a connecting rod and bracket 43 as a frame. At the same time, the cover lever 45 and carrier rod 41 (which is rigidly connected to carrier angle 42 when lock 44 is engaged) form a second four bar mechanism with rear element 38 acting as a connecting rod and bracket 43 acting as a frame. By means of this design, an especially stable and reliable guidance of rear element 38 is guaranteed in all phases of movement.

Rear roof part 37 is pivotably connected to roof lever 49 at hinge 49A, and the lower end of the roof lever 49 is pivotably connected to chassis 32 at 49B. In the base position according to FIG. 14, with side roof parts 35 interlocked on the front apron of rear roof part 37, the rear roof part 37 forms a stable roll cage with the roof levers 49 that are located on both sides of the roof.

A connecting member 50 is pivotably connected to the roof lever 49 between joints 49A and 49B at hinge point 50A. Connecting member 50 has an S-shaped curve and its lower end makes sliding engagement with a guide pin 51 which is mounted on the chassis. The sliding engagement of guide pin 51 enables shifting and swinging of connecting member 50 around this guide pin 51.

A retaining bracket 52 has a roughly U-shaped appearance and is pivoted to rear part 38 at a connecting point 52A and is connected to a sliding pin 52B in an area between the two arms of the U shape. Sliding pin 52B slidingly engages connecting member 50 above guide pin 51. Retaining bracket 52 is shown enlarged in FIG. 20 and is described in detail below. It is used to join rear part 38 to rear roof part 37.

Figure 19:
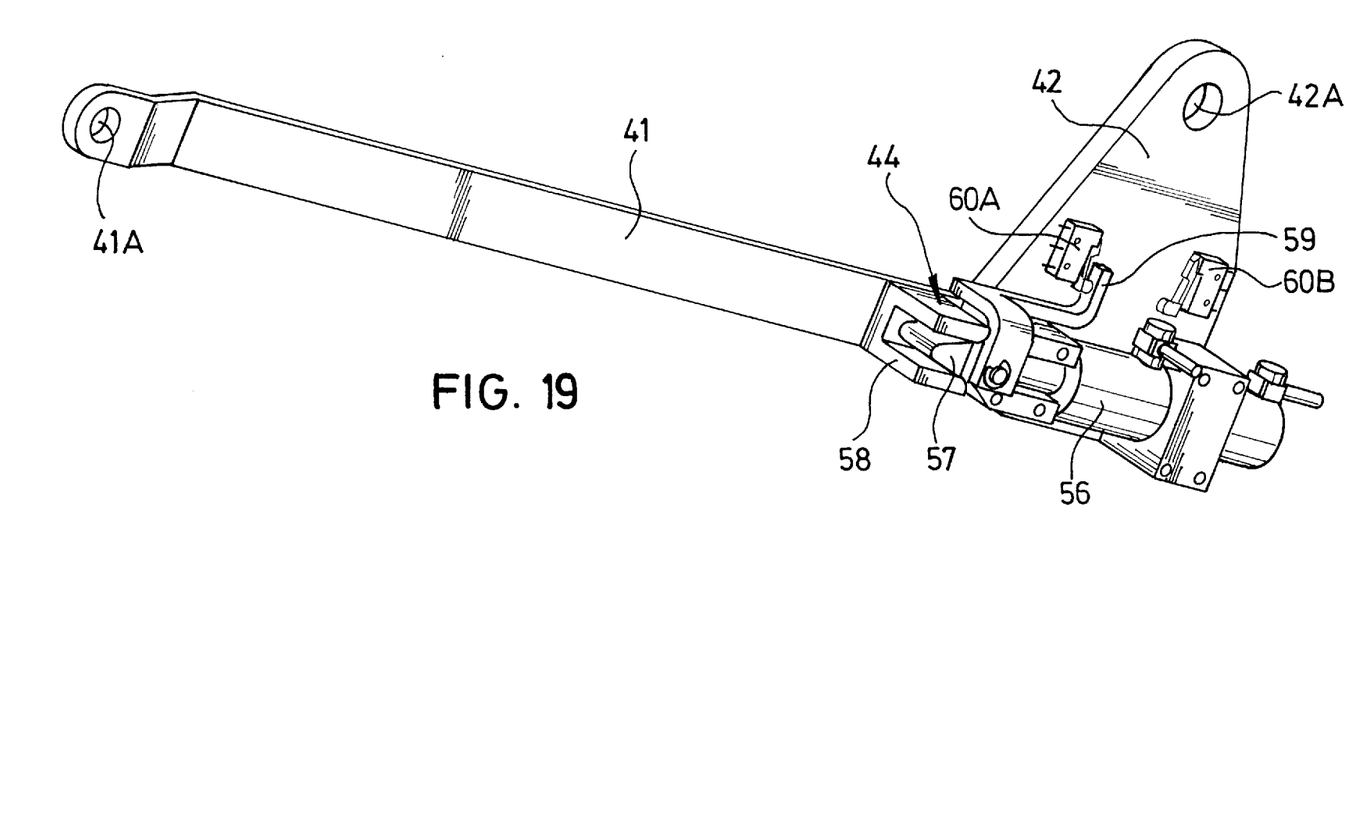
FIG. 19 shows an enlarged representation of a lock between a carrier rod and a carrier angle.

FIG. 19 shows in detail the connection of carrier rod 41 to carrier bracket 42 via lock 44. On the inside of carrier bracket 42, a hydraulic cylinder 56 is attached which pushes a locking projection 57 back and forth with its piston. When the piston of hydraulic cylinder 56 is extended, locking projection 57 engages a latch catch 58 which is attached on the inside of carrier rod 41. A switching clip 59 is attached laterally to locking projection 57 and interacts with two microswitches 60A and 60B for deactivation of hydraulic cylinder 56 in its two end positions. The interlocking position of lock 44 shown in FIG. 19 corresponds to the phases of motion shown in FIGS. 14 through 16. As the vehicle roof is lowered further from the position shown in FIG. 16 into the end position of FIG. 17, the locking projection 57 is disengaged from the latch catch 58, by which carrier rod 41 turns relative to guide angle 42, thereby enabling a flatter retraction of the roof package into stowage space 62.

Figure 20:
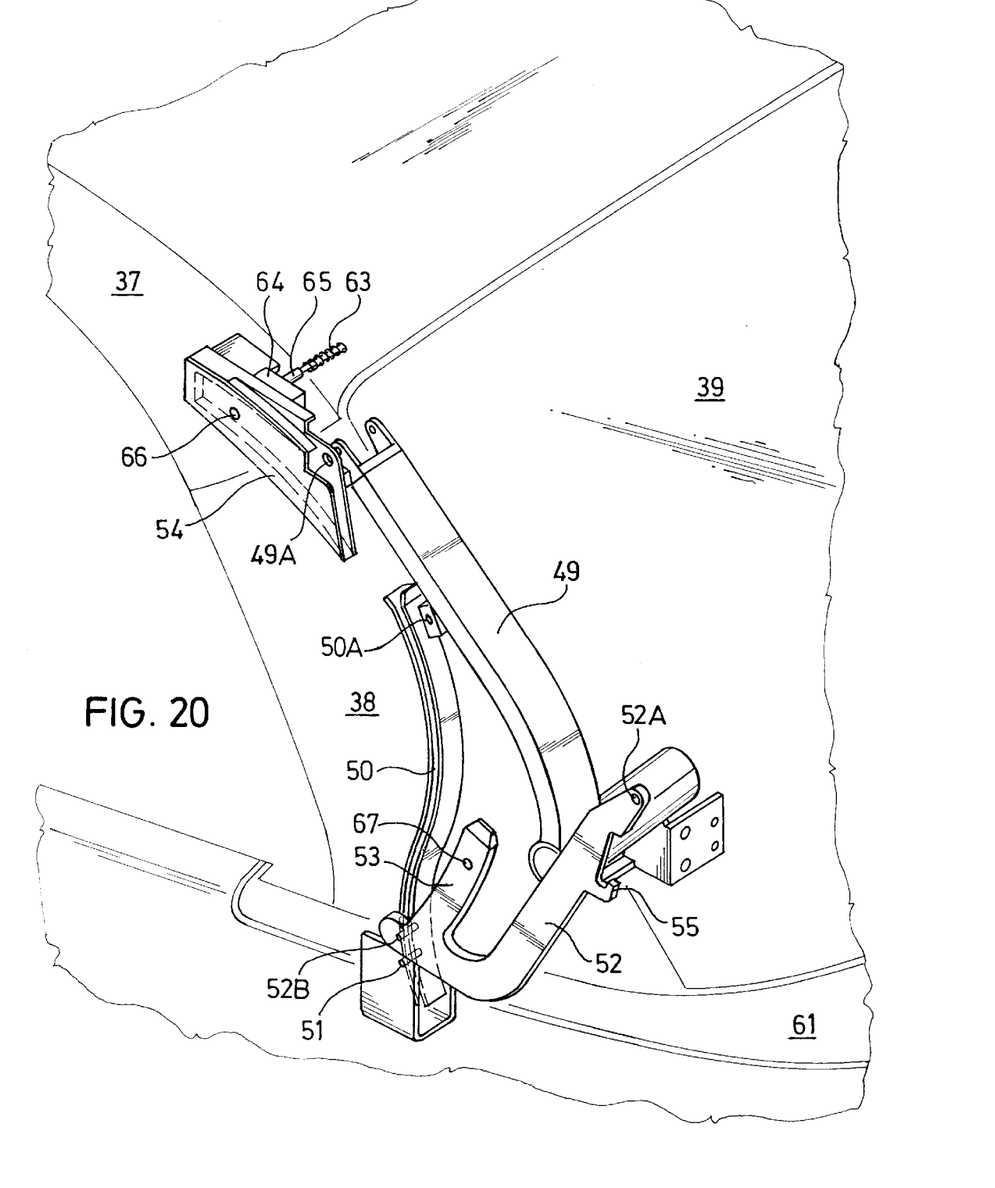
FIG. 20 is an enlarged representation of the interlocking mechanics between the rear roof part and the rear part.

FIG. 20 shows the mechanics used to lock the rear part 38 to rear roof part 37. Retaining bracket 52 has a somewhat shorter front arm 53 which serves as a locking part. A receiver 54 adapted to the shape of this locking part 53 is attached to the bottom of rear roof part 37. When rear part 38 moves out of the position shown in FIG. 14 into the position shown in FIG. 15, the retaining bracket 52 is dragged upward at the same time by its connection to rear part 38 at joint 52A. By the engagement of sliding pin 52B with connecting member 50, the locking part 53 is inserted exactly into receiver 54 as a result of its swinging motion. After locking part 53 is guided by receiver 54, sliding pin 52B leaves connecting member 50 at its upper end. When the swinging motion of rear part 38 ends, locking part 53 is pushed completely into receiver 54, hole 67 provided in locking part 53 lies congruently to hole 66 in receiver 54. By brief actuation of the drive for movable roof part 36, the drive not being shown, but which is positioned analogously to the first embodiment and is labelled 16 in FIG. 3, locking pin 65 (which is connected to a drive cable 63 and which is movably supported in a guide piece 64 on receiver 54) is pushed as a catch element into the two holes 66 and 67, by which complete interlocking of rear part 38 with rear roof part 37 is effected. Retaining bracket 52 on its longer arm has a bearing projection 55 on its outer side and against which the bottom of rear part 38 rests as the result of its own weight and also remains in constant contact during the following swinging movements.

In the following, the sequence of movements produced when the vehicle roof is opened is described using FIGS. 14–17.

Figure 14:
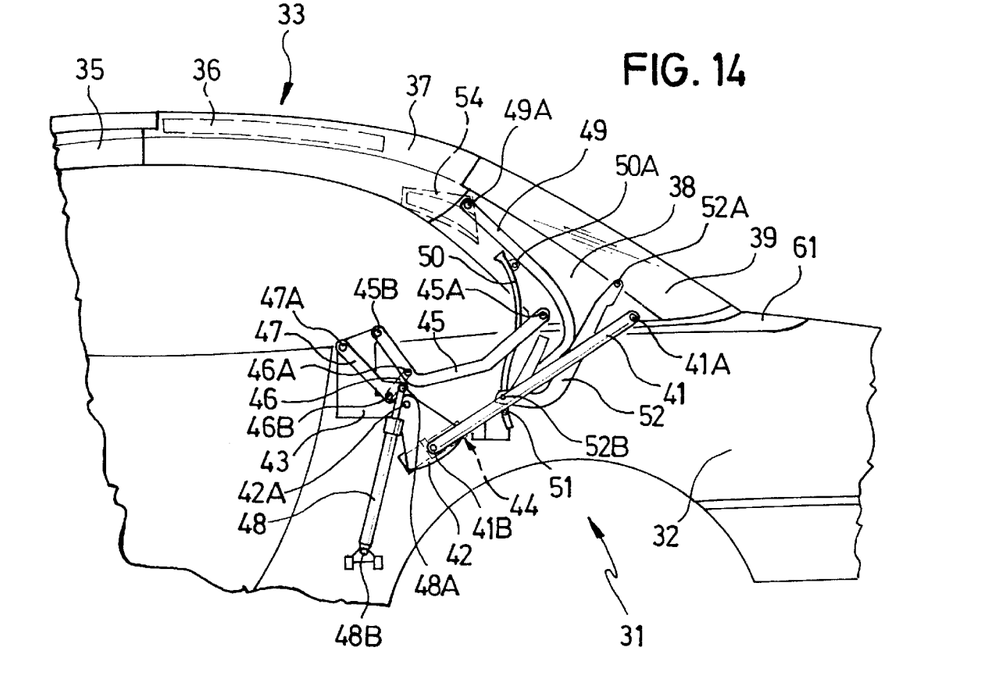
FIG. 14 is a schematic side view of an alternative embodiment in the closed position of the roof.
Figure 15:
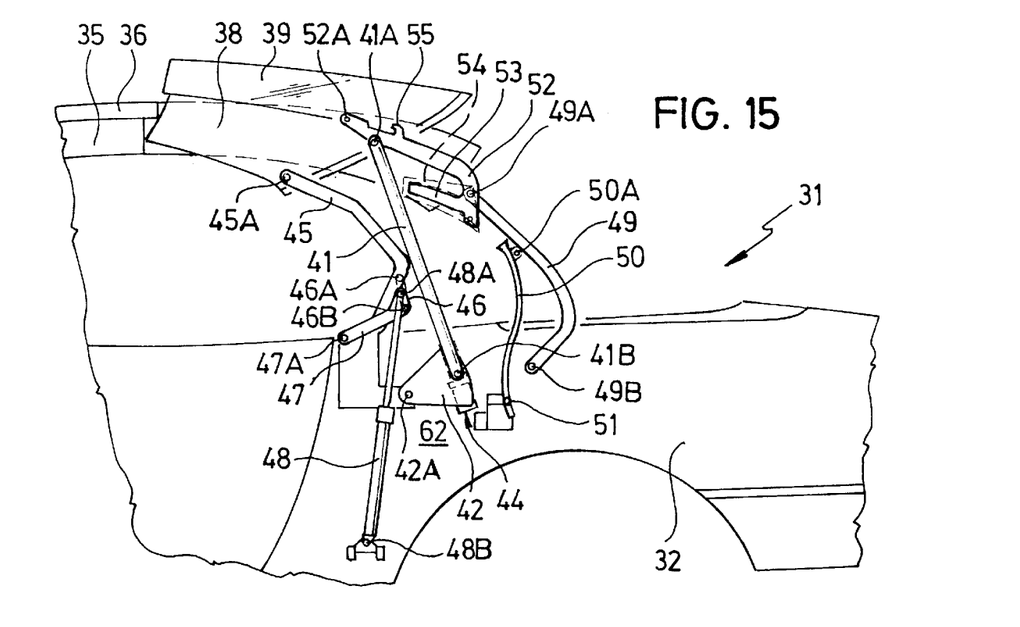
FIG. 15 shows a view according to FIG. 14 with the rear part swung up.
Figure 16:
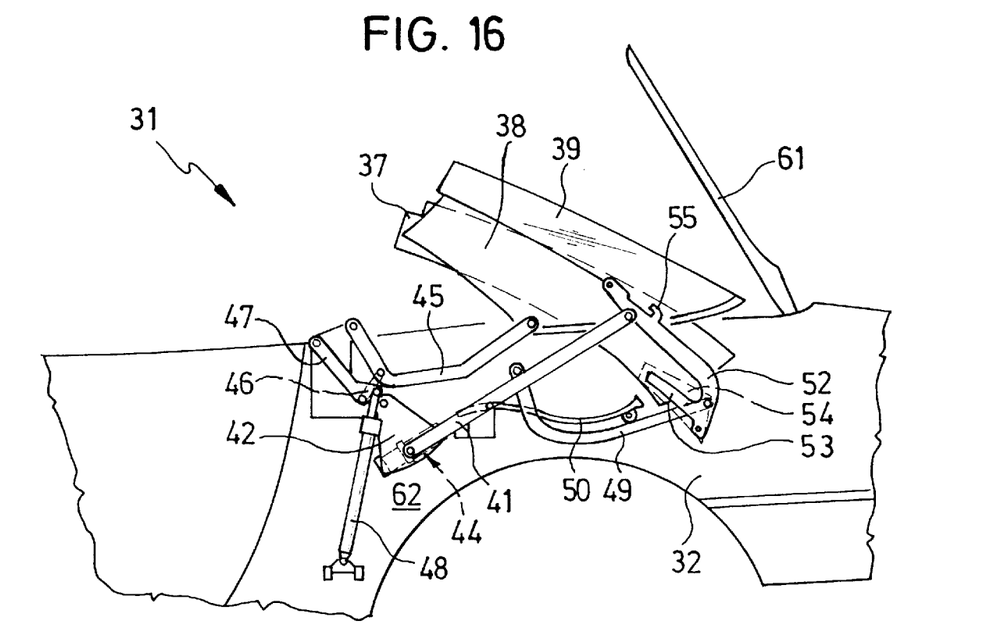
FIG. 16 shows a view according to FIG. 14 with the roof package partially swung to the rear.
Figure 17:
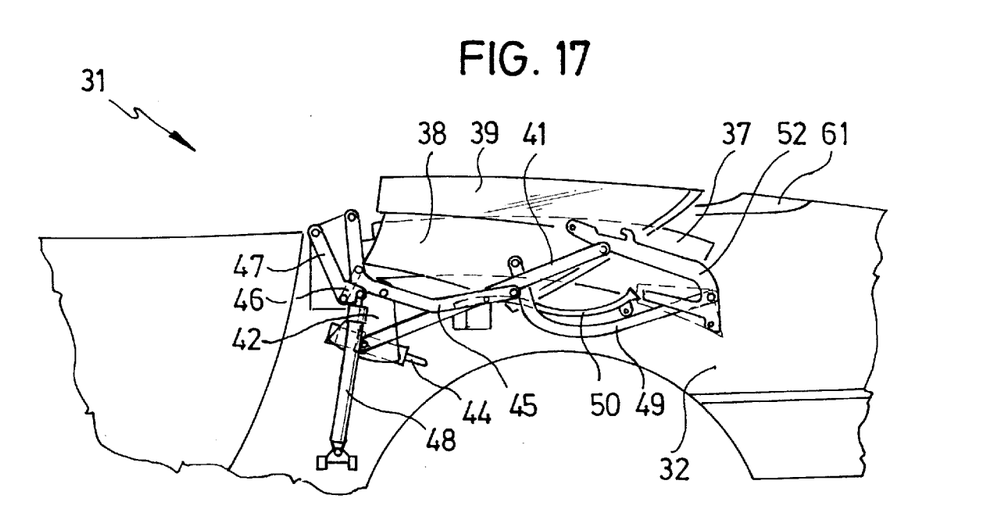
FIG. 17 shows a view according to FIG. 14 with the roof package completely retracted into the stowage space.

In FIG. 14, openable roof part 36 is retracted into rear roof part 37. Side roof parts 35 are still interlocked with the front transverse windshield support. The side windows are lowered. By extending main cylinder 48, the drive lever 47 is moved in a counterclockwise direction around bearing point 47A. Since the drive carrier 46 couples the drive lever 47 to the cover lever 45, the cover lever 45 follows this pivoting movement. Carrier rod 41, which is rigidly connected to carrier bracket 42 by means of lock 44, guides rear part 38, additionally, by pivoting around bearing point 42A of carrier bracket 42. By extending main cylinder 48, the rear part 38 executes a swinging motion, in the first phase of which it is raised to the outside from rear roof part 37 and the cover flap 61 on which it sits tightly in the closed state from the top. In the second phase of the swinging motion, rear part 38 is swung over rear roof part 37. In this case, the retaining bracket 52, as described above, is dragged upward at the same time and causes interlocking of rear part 38 with rear roof part 37. In the position reached at this point, which is shown in FIG. 15, side roof parts 35 are released from the front transverse windshield support 4 and are pivoted laterally inward against rear roof part 37. Subsequently, the main cylinder 48 is retracted causing the roof package formed by side roof parts 35, openable roof part 36, rear roof part 37 and rear part 38 to swing rearward into the position shown in FIG. 16. The roof package is supported here on cover lever 45, carrier rod 41 and roof lever 49. Before swinging from the position shown in FIG. 15 into the position shown in FIG. 16, the cover flap 61, at its front edge, is swung upwards in order to expose the stowage space 62 in the rear part of the vehicle. In the view shown in FIG. 16, lock 44 between carrier rod 41 and carrier bracket 42 is released, so that, when the main cylinder 48 is completely retracted, the roof package rests flat in stowage space 62, and thus, adapts to the contour of the vehicle. After complete retraction into stowage space 62 (FIG. 17), cover flap 61 is closed. The vehicle now looks like a convertible with cover completely lowered.

The process of closing the two roof modules proceeds in the reverse sequence to the described opening process. It goes without saying for one skilled in the art that all parts for swinging and locking the roof parts in the two versions, even though described above in the singular, are provided on each of the two vehicle sides. In the second version, the attachment points located permanently on the chassis, such as bracket 43, bearing 48B of main cylinder 48, support 49B of roof lever 49 and the support of guide pin 51, are preferably combined in a cassette, which can be adjusted via horizontal and vertical longitudinal holes relative to chassis 32 during installation.

By means of the invention, a convertible vehicle roof is devised which when closed due to the rigid parts used exclusively in doing so offers the complete protection against weather effects and accidents of a closed hardtop sedan or coupe and which, however, in the retracted state offers all advantages of a typical fabric roof convertible. Based on the subdivision of the vehicle roof into a rear roof part and a rear part which can be swung one over the other, the required stowage space for the entire roof package is reduced and the interface of the vehicle roof to cover flap 20 or 61 attached permanently to the chassis can be more easily handled with respect to sealing properties and tolerance compensation.

By combining all attachment points of the roof module which are to be permanently attached to the chassis in a cassette, pretesting and installation of such a roof module is greatly simplified.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Convertible vehicle roof comprising a rigid rear roof part, a rigid rear part which adjoins the rear roof part; a stowage space located in rearwardly of the passenger space, and means for reconfiguring and moving the rear roof part with the rear part and other roof parts from a closed roof configuration for enclosing a vehicle passenger space from above into the stowage space located in rearwardly of the passenger space; wherein the means for reconfiguring and moving includes means for swinging the rear part forwardly over the rear roof part for enabling the rear part to be moved into the stowage space together with the rear roof part.

2. Vehicle roof according to claim 1, further comprising means for interlocking the rear part with the rear roof part before they are moved into the stowage space.

3. Vehicle roof according to claim 1, wherein lateral roof parts are provided at lateral sides of the roof, and at least one movable sunroof cover part is mounted on guides located in the lateral roof parts for enabling an opening movement thereof during driving in a longitudinal direction of the vehicle into open positions.

4. Vehicle roof according to claim 3, wherein the lateral roof parts are supported on the rear roof part, the cover part moving toward the rear roof part during said opening movement.

5. Vehicle roof according to claim 3, wherein a releasable locking means is provided for interlocking the lateral roof parts with a stationary front part of the roof.

6. Vehicle roof according to claim 3, wherein the lateral roof parts are mounted to swing inward against the rear roof part.

7. Vehicle roof according to claim 1, wherein the rear part surrounds a rear window.

8. Vehicle roof according to claim 1, wherein a cover flap is provided for closing the stowage space; and wherein the rear part lies tightly on top of the cover flap in the closed roof configuration.

9. Vehicle roof according to claim 1, wherein the means for reconfiguring and moving further comprises means for raising the rear part before it is swung over the rear roof part.

10. Vehicle roof according to claim 1, wherein the rear part is supported on a lever which is pivotably mounted on a vehicle chassis by means of two telescopically extendable cylinders.

11. Vehicle roof according to claim 10, wherein said lever is a generally triangular lever with two arms which converge at a pivot axis of the lever with respect to the vehicle chassis; wherein a lower end of each of the extendable cylinders is connected to an outer end of a respective one of the arms of the lever.

12. Vehicle roof according to claim 11, wherein one end of a swinging cylinder is supported on the vehicle chassis and an opposite end of the swinging cylinder is connected to a lower one of said arms.

13. Vehicle roof according to claim 12, wherein the rear roof part is connected via a swing arm lever to the vehicle chassis.

14. Vehicle roof according to claim 13, wherein the triangular lever has a pivot and the swinging cylinder and the swing arm lever have lower connecting points, the pivot and the lower connecting points being located on a cassette which is adjustably attached to the vehicle chassis.

15. Vehicle roof according to claim 1, wherein a pair of guide arms are pivotably interconnected between the rear part and a vehicle chassis for guiding the rear part when it is swung.

16. Vehicle according to claim 15, wherein one of the guide arms is coupled to a hydraulic cylinder.

17. Vehicle roof according to claim 16, wherein the two guide arms form a four bar mechanism in which the rear part forms a connecting rod and a part permanently connected to the vehicle chassis forms a frame.

18. Vehicle according to claim 17, wherein one of the guide arms is pivotably connected to a carrier element which is pivotably connected to the vehicle chassis; and wherein lock means is provided for releasably locking the carrier element relative to said one of the guide arms for preventing pivoting movement therebetween except in a last phase of movement of the roof part and rear part into the stowage space.

19. Vehicle roof according to claim 2, wherein a retaining bracket is provided for interlocking the rear part with the rear roof part, said retaining bracket having one end pivotably mounted on the rear part and a slide pin which, during movement of the rear part above the rear roof part, engages a connecting member which forms a means for inserting a locking part of the retaining bracket into a receiver on the rear roof part.

20. Vehicle roof according to claim 19, wherein a catch element is provided for locking the locking part to the receiver; and wherein a drive cable of a drive device which actuates the openable roof part is connected to the catch element for engaging and releasing it with respect to the locking part and receiver.

* * * * *